Aug. 5, 1969   J. R. CRUMP   3,458,920
METHOD OF COUPLING PIPE
Original Filed Jan. 16, 1963
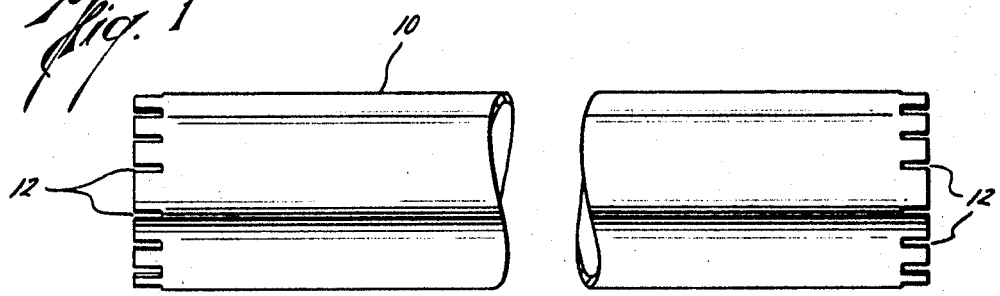
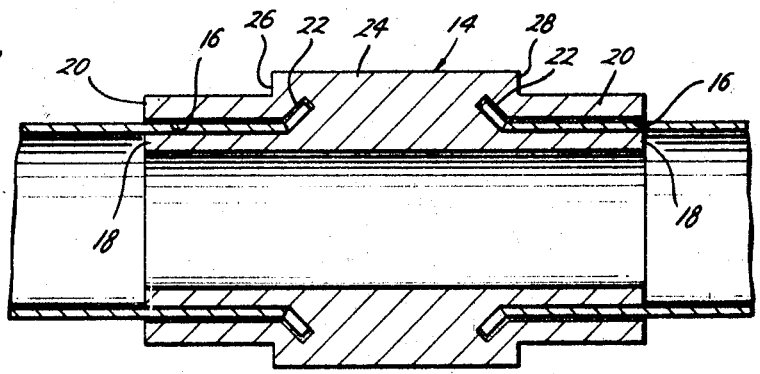
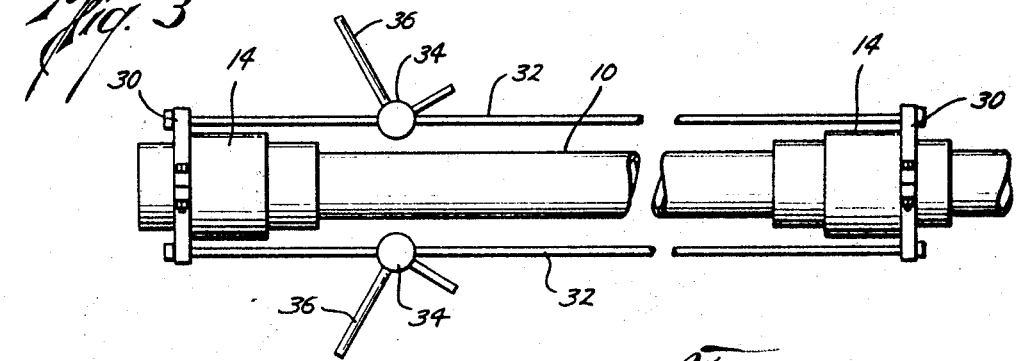
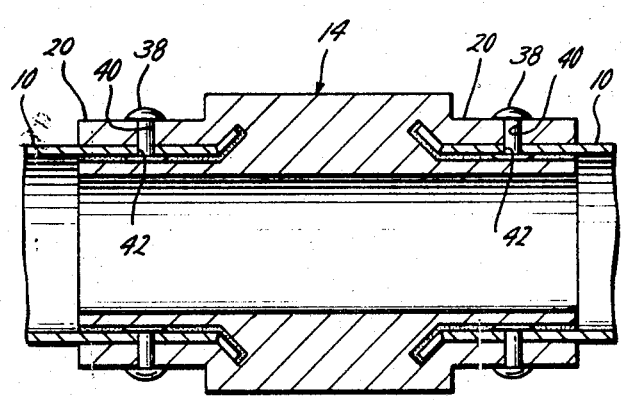
Joseph R. Crump
INVENTOR.
BY
ATTORNEY United States Patent Office 3,458,920
Patented Aug. 5, 1969

3,458,920
METHOD OF COUPLING PIPE
Joseph R. Crump, 2018 Timber Lane,
Houston, Tex. 77027
Continuation of application Ser. No. 251,878, Jan. 16,
1963. This application Apr. 12, 1965, Ser. No. 449,682
Int. Cl. B23p 3/00, 25/00
U.S. Cl. 29—458                                     2 Claims

ABSTRACT OF THE DISCLOSURE

A coupling having oppositely disposed grooves, with a frusto-conical portion in each groove, is positioned at each end of a pipe segment. Plastically deformable sealant material is placed within such frusto-conical portion prior to insertion therein of the pipe end. Pressure is applied so as to force the pipe ends into the grooves' frusto-conical portion which contains the sealant.

---

This application is a continuation of my copending application Ser. No. 251,878, filed Jan. 16, 1963, now abandoned.

This invention relates to pipe couplings and more particularly it relates to means for quickly and easily joining toegther pipe sections in a coupling which provides a fluid tight joint between the pipe sections and further which provides means for positively preventing movement of the pipe sections away from each other.

The method of this invention provides means for upsetting the ends of a pipe section within a groove in a pipe coupling and further provides means for insuring a fluid tight joint between two pipe sections. In a preferred embodiment the invention envisions the use of a plastic, in the sense of plastically deformable or non-hardening sealing compound in a groove in the coupling which surrounds the end of a pipe section to provide a positive seal against leakage between the pipe section and the coupling. The invention further comprises the use of two separate and distinct means for retaining the end of a pipe section witthin the groove in the coupling so as to positively prevent the forces due to the pressures carried by the pipe from causing separation of the pipe and coupling. It is anticipated that the method of this invention will be particularly advantageous in fabricating lines for use in cross-country pipelines wherein it has been found that the usual threaded connections or welded connections are not completely satisfactory.

For a better understanding of the invention reference is now made to the accompanying drawings wherein FIGURE 1 is an elevational view of a preferred embodiment of a pipe section used in the pipe joint of this invention;

FIGURE 2 is a longitudinal sectional view of a preferred embodiment of a joint formed between a coupling and two pipe sections;

FIGURE 3 is an elevational view showing the means and method by which the pipe sections are joined together according to a preferred embodiment of the invention; and FIGURE 4 is a longitudinal sectional view of a modification of the invention.

As shown in the embodiment of FIGURE 1, a pipe section 10 is provided with longitudinally extending slots 12 in each end. The slots extend only a relatively short distance, for example, no more than about one inch in an eight inch diameter pipe. In making up a joint according to one embodiment of the invention a pipe section as shown in FIGURE 1 is inserted into a coupling 14. The coupling 14 comprises a substantially tubular member having formed in each end a longitudinally extending annular groove 16 between the inner wall 18 and the outer wall 20 of the coupling. Each of the grooves 16 extends substantially longitudinally of the coupling for a substantial distance, i.e., about ⅓ of the length of the coupling, and then diverges outwardly in a substantially frusto-conical portion 22. An annular collar 24 surrounding the coupling and formed integrally therewith provides shoulders 26 and 28 around the body of the coupling.

To form a joint according to this embodiment of the invention the end of a slotted pipe as shown in FIGURE 1 is inserted into the groove 16 and forced into the frusto-conical portion 22 with sufficient force to cause the slotted end of the pipe to be deformed by the divergent part of the groove and diverged outwardly to conform substantially with the shape of the frusto-conical portion of the groove. Preferably the bottom of the groove, i.e., the frusto-conical portion and the portion immediately adjacent thereto, has been filled with a plastically deformable or non-hardening plastic sealing compound before inserting the pipe section. This sealing compound then provides a fluid tight seal between the pipe section and the coupling. Such plastic sealants are well known in the art and need not be described here. For example, various silicone resins, and the usual non-hardening pipe joint compounds may be used for this purpose. Following the insertion of the end of the pipe section into the groove, the remainder of the groove is filled with an adhesive material which permanently binds the pipe end to the portion of the coupling forming the outer part of the groove and thereby prevents any disengagement of the pipe end from the groove as well as providing means preventing any loss of the plastic sealing material from the groove. The adhesive used may be any of those well known in the art, for example of the epoxy adhesive type.

The pipe ends are forced into the coupling grooves by means of force applied to the shoulders 26 and 28 of the couplings, for example in the manner shown in FIGURE 3. In this figure two couplings 14 are shown being installed upon a pipe section 10. A split collar 30 surrounds the remote ends of each of the couplings and abuts the collar 24 on each coupling. Cables 32 extend from each collar 30 to a "come-along" 34 which, as is well known in the art, may be operated by movement of a handle 36 to apply tension to the cables 32 and thereby move the couplings toward each other and force the pipe ends into the respective grooves in the couplings to provide the desired deformation of the pipe ends.

The embodiment of the invention depicted in FIGURE 4 is quite similar to the embodiment just described in many respects, however, in this embodiment a plurality of rivets 38 extend through aligned apertures 40 and 42 in the outer wall 20 of the coupling and the pipe 10 respectively. The rivets may be of the explosive type, such as are well known in the art, which may be inserted into the aligned apertures and then exploded to rigidly secure the pipe end within the groove of the coupling. When the embodiment of FIGURE 4 is used it is not necessary to utilize the adhesive material as heretofore described in connection with the previous embodiment. It is apparent that the rivets 38 provide adequate means for firmly securing the pipe ends within the coupling and that the plastic material at the bottom of the grooves provides secure sealing between the pipe end and the coupling.

An important feature of this invention is the provision of the collars 24 on the couplings to provide means adapted to be engaged by the "come-along" or other means for forcing the pipe ends into the couplings. The use of these collars allows both ends of the pipe to be engaged in a coupling at the same time, whereas if force had to be applied to the pipe directly, only one end could be engaged at a time.

Another important feature of the invention is the use of a plastic sealing compound, which will allow some flexing of the pipe within the coupling without destroying the pressure-tightness of the joint.

Although specific embodiments of the invention have been shown and described herein the invention is not limited to such embodiments but only as set forth by the following claims.

I claim:
1. A method for assembling couplings on a pipe joint, said couplings each being provided with shoulders against which a longitudinal force may be exerted and end-facing grooves, said grooves having a frusto-conical portion, and said grooves having an opening sized to receive a pipe end, comprising:
   providing a non-hardening deformable sealant material within said frusto-conical portion of said couplings;
   positioning a coupling adjacent each end of a pipe joint with each end of the pipe joint partially received in one of said openings in said grooves; and
   applying power means between the shoulders of said couplings to pull the couplings toward each other thereby forcing and deforming the pipe ends into said frusto-conical portion of said grooves.

2. A method for assembling couplings on a joint of pipe, comprising:
   positioning a coupling having an end-facing groove, said groove having a frusto-conical portion, and said groove having an opening to receive a pipe end, adjacent each end of the pipe;
   providing a non-hardening deformable sealant material within said frusto-conical portion;
   pulling the couplings toward each other by applying forces between the couplings to force the ends of the pipe into the said grooves thereby forcing and deforming the ends of the pipe into the frusto-conical portion of said grooves sufficient to hold the pipe in the grooves, and
   inserting means at least partially within the portion of said grooves away from said frusto-conical portion to resist separation of said pipe from said coupling.

References Cited

UNITED STATES PATENTS

| | | | |
|---|---|---|---|
| 409,008 | 8/1889 | Breymann | 29—237 |
| 2,126,053 | 8/1938 | Springings. | |
| 2,005,267 | 6/1935 | Rehder. | |
| 2,534,198 | 12/1950 | Guarmaschelli | 285—404 X |
| 2,785,910 | 3/1957 | Munger | 285—423 X |
| 2,998,269 | 8/1957 | Houghton | 285—423 X |
| 3,133,753 | 5/1964 | Goodman | 285—331 X |
| 1,921,642 | 8/1933 | Stephenson | 285—331 |
| 2,457,633 | 12/1948 | Borg | 285—331 |
| 3,124,874 | 3/1964 | Wolley | 29—458 |
| 3,068,563 | 12/1962 | Reverman | 29—458 |
| 391,456 | 10/1888 | Cross. | |
| 910,885 | 1/1909 | Waltz | 285—404 X |
| 1,021,485 | 3/1912 | Ross | 285—382.4 |
| 1,176,842 | 3/1916 | Lukomski | 285—295 X |
| 1,921,978 | 8/1933 | Leary | 285—331 |
| 1,951,122 | 3/1934 | Blaze | 285—284 |

FOREIGN PATENTS

| | | |
|---|---|---|
| 624,074 | 12/1935 | Germany. |
| 297,122 | 3/1954 | Switzerland. |

CHARLIE T. MOON, Primary Examiner

U.S. Cl. X.R.

29—237, 238, 522, 523, 526; 285—331